United States Patent [19]
Tagawa

[11] Patent Number: 6,002,555
[45] Date of Patent: Dec. 14, 1999

[54] THIN FILM MAGNETIC HEAD

[75] Inventor: Ikuya Tagawa, Kanagawa, Japan

[73] Assignee: Fujitsu Limited, Kawasaki, Japan

[21] Appl. No.: 09/024,068

[22] Filed: Feb. 17, 1998

[30]   Foreign Application Priority Data

Oct. 9, 1997  [JP]  Japan .................................. 9-245840

[51] Int. Cl.⁶ .............................. G11B 5/147; G11B 5/39
[52] U.S. Cl. ........................................ 360/126; 360/113
[58] Field of Search ...................................... 360/113, 126

[56]   References Cited

U.S. PATENT DOCUMENTS

| | | |
|---|---|---|
| 5,438,747 | 8/1995 | Krounbi et al. . |
| 5,661,449 | 8/1997 | Araki ........................................ 360/113 |
| 5,872,693 | 2/1999 | Yoda ........................................ 360/126 |

FOREIGN PATENT DOCUMENTS

| | | |
|---|---|---|
| 720153A2 | 7/1996 | European Pat. Off. . |
| 7153022 | 6/1995 | Japan . |
| 7153033 | 6/1995 | Japan . |

*Primary Examiner*—A. J. Heinz
*Attorney, Agent, or Firm*—Greer, Burns & Crain, Ltd.

[57]   ABSTRACT

A thin film magnetic head includes an inductive head and an MR head. The resistance of one magnetic shielding layer is higher than the resistance of an opposed shielding layer, to increase the efficiency of the recording magnetic field. In one embodiment, the rear area of the magnetic layer includes a notched portion. In another embodiment, the resistivity of the material in one magnetic layer is increased with respect to the resistivity of the material used in the opposing magnetic layer.

12 Claims, 9 Drawing Sheets

THIN FILM MAGNETIC HEAD

BACKGROUND OF THE INVENTION

1. Field of the Invention

The present invention relates to a magnetic head and, more particularly, a composite magnetic head which has an inductive element and a magnetoresistive element and is incorporated into a magnetic recording/reproducing device such as a magnetic disc drive, a magnetic tape drive, etc.

2. Description of the Prior Art

In the technical field of a magnetic disc drive, a magnetic tape drive, etc., a composite magnetic head in which a recording head and a reproducing head are provided separately has been used to achieve a higher magnetic recording density and a higher speed recording/reproducing operation.

The composite magnetic head has a structure in which an induction type head having a spiral coil is superposed on a reproducing head using a magnetoresistive element (referred to as an "MR head" hereinafter). Both the recording and reproducing operations can be effected by the induction type head, but in general the induction type head of the composite magnetic head has been used only for the recording operation. The composite magnetic heads can be classified into a joint type and a separate type according to a difference whether or not a part of a magnetic pole of the induction type head is used commonly as an upper magnetic shielding layer of the MR head.

As shown in FIG. 1A, the joint type composite magnetic head is formed to have such a structure that an upper magnetic shielding layer 101 of an MR head 100 can execute commonly a function of a lower magnetic pole of an induction type head 110. The MR head 100 comprises the upper magnetic shielding layer 101, a lower magnetic shielding layer 102, and a magnetoresistive element 103. The magneto-resistive element 103 is isolated from the upper magnetic shielding layer 101 and the lower magnetic shielding layer 102 by an insulating layer 104. The induction type head 110 includes a spiral coil 111 a part of which is covered with an insulating layer 112. A part of the spiral coil 111 is surrounded by a magnetic pole which is composed of the upper magnetic shielding layer 101 and an upper magnetic pole 113.

As shown in FIG. 1B, the separate type composite magnetic head is formed to have such a structure that an upper magnetic shielding layer 121 of an MR head 120 is separated from a lower magnetic pole 131 of the induction type head 130. The MR head 120 comprises an upper magnetic shielding layer 121, a lower magnetic shielding layer 122, and a magnetoresistive element 123. The magnetoresistive element 123 is isolated from the upper magnetic shielding layer 121 and the lower magnetic shielding layer 122 by an insulating layer 124. In the induction type head 130, a part of the spiral coil 131 which is covered with an insulating layer 132 is surrounded by a loop magnetic pole. The magnetic pole consists of a lower magnetic pole 131 and an upper magnetic pole 133.

A recording gap g is formed in the magnetic poles over the magnetoresistive element 103. Similarly, the recording gap g is formed in the magnetic poles over the magnetoresistive element 123. The magnetic field generated from the spiral coil 111 is passed through the magnetic pole, and then output as the recording magnetic field to a magnetic recording medium (not shown) from the recording gap g. Similarly, the magnetic field generated from the spiral coil 131 is passed through the magnetic pole, and then output as the recording magnetic field to the magnetic recording medium (not shown) from the recording gap g.

In the joint type composite magnetic head, if a step-like unevenness or projection resides below the spiral coil 111, the spiral coil 111 is cut or broken away by the step-like projection when the spiral coil 111 is formed, otherwise the spiral coil 111 is made thinner by the presence of the step-like projection to result in an increase of electric resistance. In addition, lead wirings to be connected to the magnetoresistive element 103 of the MR head is cut or broken away or made thinner by the step-like projection. The same is true of the separate type composite magnetic head.

For this reason, in the joint type composite magnetic head, difference in level caused below the spiral coil 111 is made small by extending the lower magnetic shielding layer 102 up to a rear side area of the joint type composite magnetic head in which the magnetic pole 113 is not present and which is remote from the magnetoresistive element 103. Similarly, in the separate type composite magnetic head, difference in level step caused below the spiral coil 131 is reduced by extending the upper magnetic shielding layer 121 up to a rear side area of the separate type composite magnetic head in which both the upper magnetic pole 133 and the lower magnetic pole 134 are not present and which is remote from the magnetoresistive element 123.

In the joint type composite magnetic head, when a high frequency magnetic field is generated by feeding a high frequency recording current to the spiral coil 113, magnetic fields leaked from the magnetic pole are passed through the lower magnetic shielding layer 102 of the MR head 100. In the same manner, in the separate type composite magnetic head, when a high frequency magnetic filed is generated by feeding a high frequency recording current to the spiral coil 123, magnetic fields leaked from the magnetic pole are passed through the upper magnetic shielding layer 121 of the MR head 120.

However, as the frequency of the magnetic field passing through the lower magnetic shielding layer 102 or the upper magnetic shielding layer 121 is increased, an eddy current generated by the lower magnetic shielding layer 102 or the upper magnetic shielding layer 121 is increased. As a consequence, an efficiency in generating the recording magnetic field is decreased because the lower magnetic shielding layer 102 or the upper magnetic shielding layer 121 acts as a part of the magnetic path.

SUMMARY OF THE INVENTION

It is an object of the present invention to provide a composite magnetic head capable of generating a recording magnetic field with good efficiency.

According to the present invention, in the case of the joint type composite magnetic head, the planar shape of the rear side area of the lower magnetic shielding layer of the reproducing head is formed to have the U shape, or electric resistance of at least the rear side area of the lower magnetic shielding layer of the reproducing head increased whereas, in the case of the separate type composite magnetic head, the planar shape of the rear side area of the upper magnetic shielding layer of the reproducing head is formed to have the U shape or electric resistance of at least the rear side area of the upper magnetic shielding layer of the reproducing head increased.

As a consequence, in the magnetic path through which the high frequency magnetic field leaked from the recording head returns again to the recording head via the magnetic shielding layer formed below the recording head, the eddy current generated in the high resistance area of the magnetic shielding layer can be suppressed to thus reduce loss and therefore the recording magnetic field can be generated from the recording head with good efficiency.

The high resistance area may be formed on a part of the magnetic shielding layer or overall magnetic shielding layer. The high resistance area can be obtained by forming the area of the magnetic shielding layer by magnetic material with high resistance or by injecting an impurity into the area. Alternatively, in the case that the planar shape of the magnetic shielding layer is formed to have the U shape, if an angle between both side lines of the U-shaped notched portion and tangential lines to the spiral coil positioned over the notched portion is set within the range of 80 to 100 degree, breaking or thinner layer of the spiral coil due to difference in level caused by the U-shaped notched portion can be prevented.

DESCRIPTION OF THE PREFERRED EMBODIMENTS

Embodiments of the present invention will be explained with reference to accompanying drawings hereunder.

(First Embodiment)

Figure 1A:
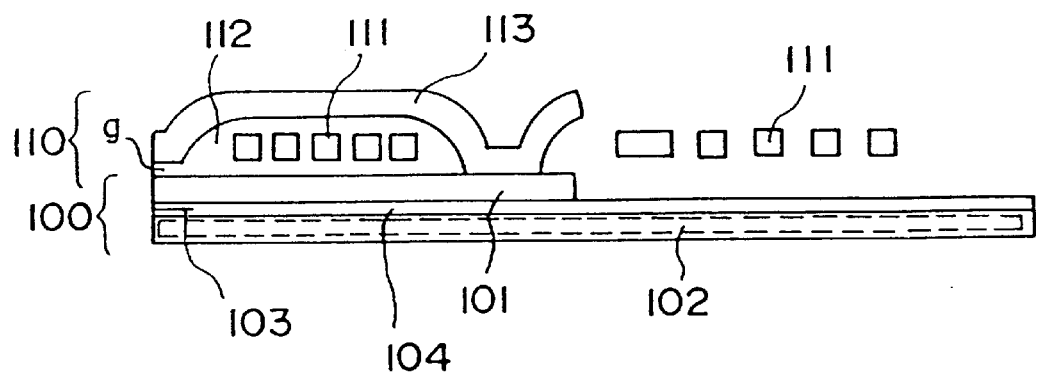
FIG. 1A is a sectional view showing a joint type composite magnetic head in the prior art.
Figure 1B:
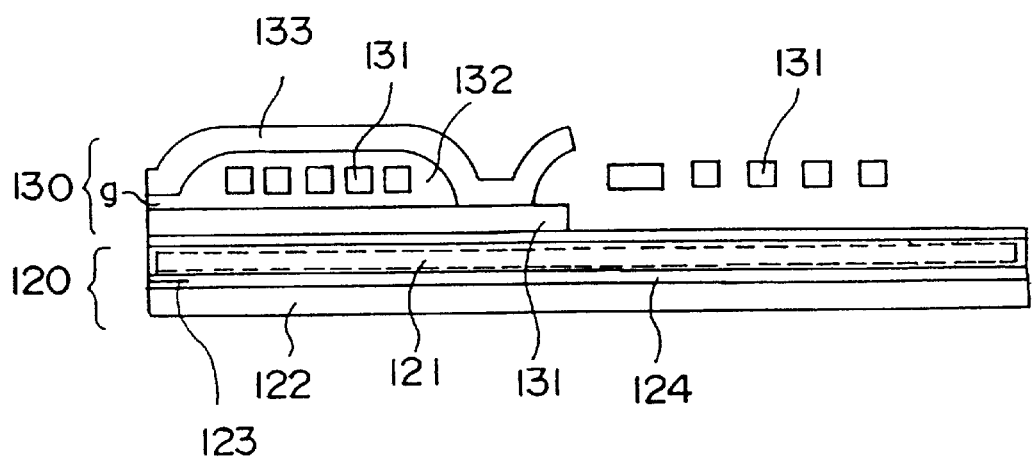
FIG. 1B is a sectional view showing a separate type composite magnetic head in the prior art.
Figure 2:
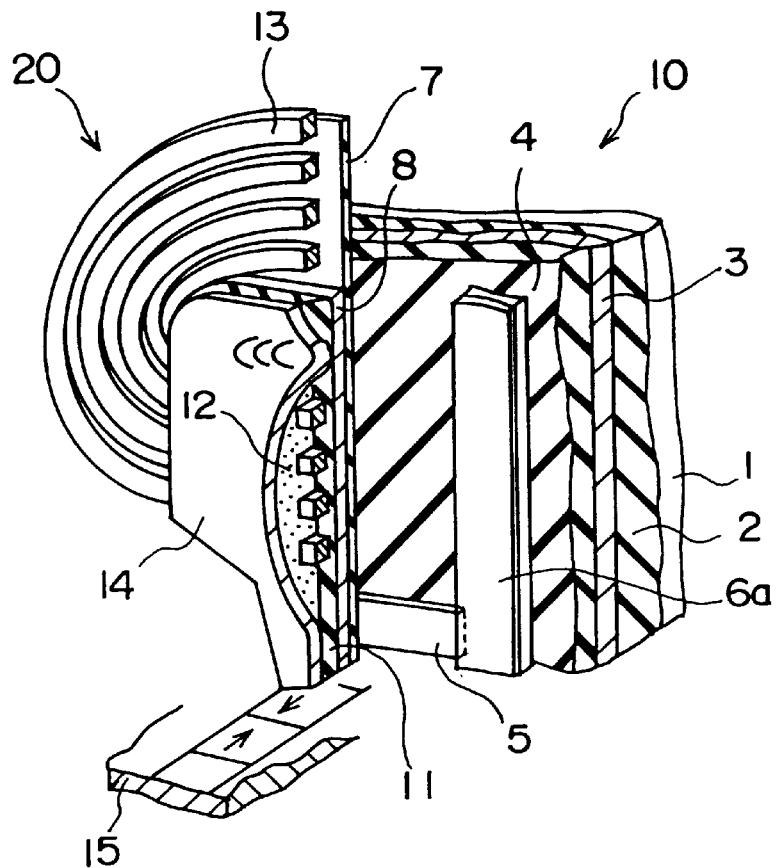
FIG. 2 is a perspective view showing a joint type composite magnetic head, which is partially cut or broken away, according to a first embodiment of the present invention.
Figure 3:
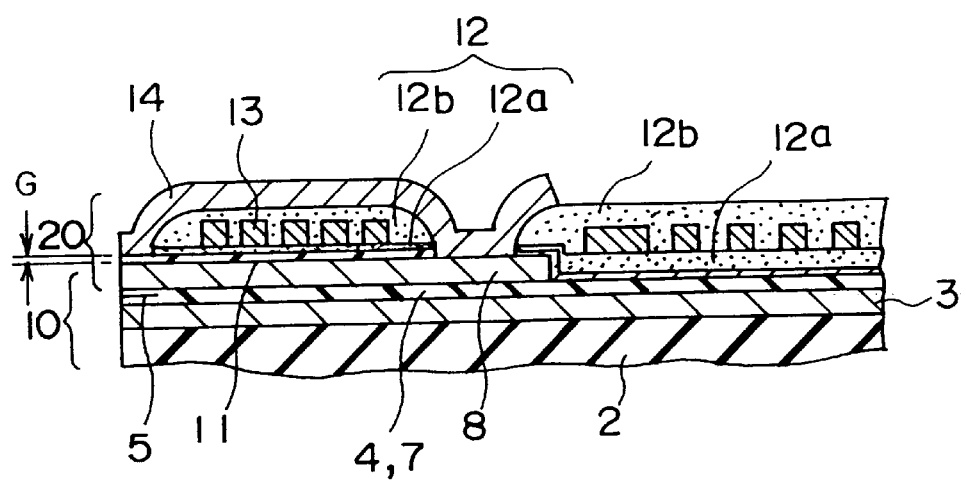
FIG. 3 is a sectional view showing the joint type composite magnetic head according to the first embodiment of the present invention.
Figure 4:
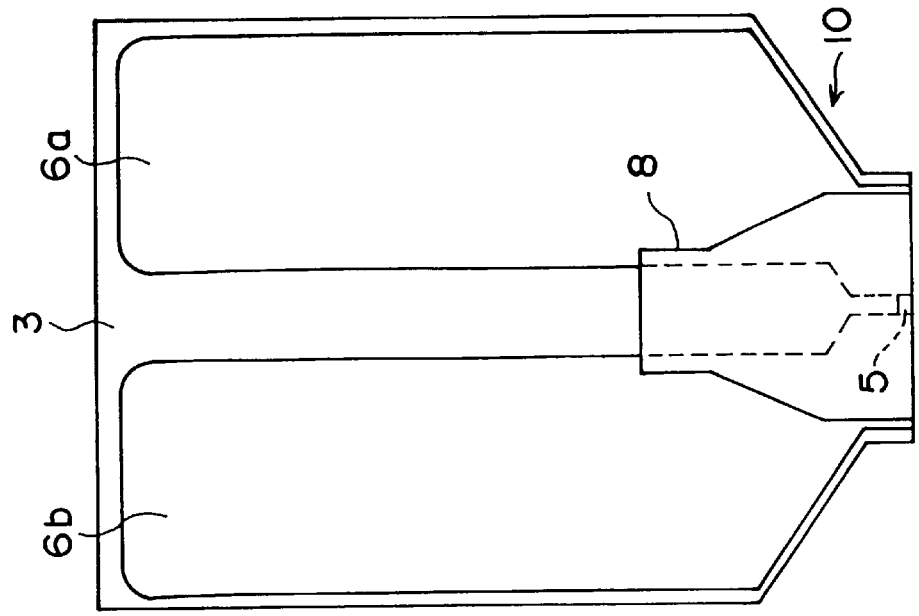
FIG. 4 is a plan view showing an MR head used in the joint type composite magnetic head according to the first embodiment of the present invention.
Figure 5:
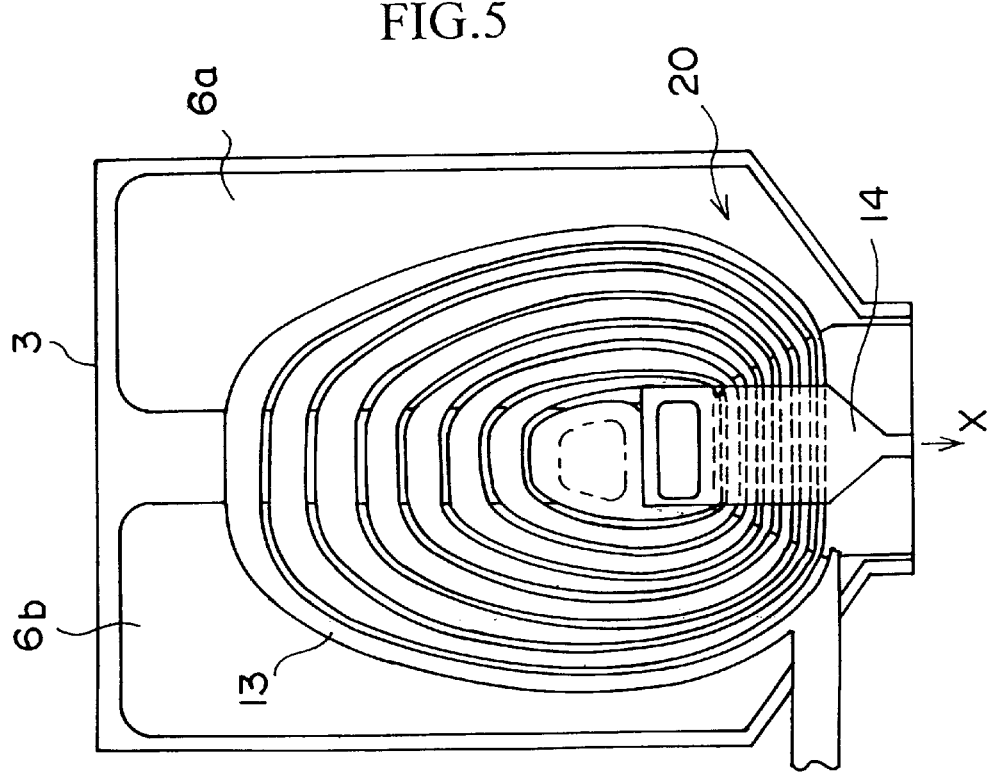
FIG. 5 is a plan view showing an induction type head used in the joint type composite magnetic head according to the first embodiment of the present invention.

FIG. 2 is a perspective view showing a joint type composite magnetic head, which is partially cut or broken away, according to a first embodiment of the present invention. FIG. 3 is a sectional view showing the joint type composite magnetic head shown in FIG. 2. FIG. 4 is a plan view showing a reproducing head for use in the joint type composite magnetic head shown in FIG. 2. FIG. 5 is a plan view showing an induction type head for use in the joint type composite magnetic head shown in FIG. 2. In FIGS. 4 and 5, an insulating layer is omitted from the joint type composite magnetic head respectively.

In FIGS. 2 to 5, a reproducing magnetoresistive head (MR head) 10 and a recording induction type head 20 are formed in sequence on a substrate 1 via a substrate protection layer 2 which is made of insulating material such as $Al_2O_3$.

A lower magnetic shielding layer 3, a lower nonmagnetic insulating layer 4 made of $Al_2O_3$, a magneto-resistive element 5, an upper nonmagnetic insulating layer 7 made of $Al_2O_3$, and an upper magnetic shielding layer 8 are formed in order on the substrate protection layer 2, whereby the MR head 10 is constituted.

As first magnetic material for the lower magnetic shielding layer 3, such material is selected that has electric resistance larger than that of second magnetic material for the upper magnetic shielding layer 8. For example, in the case that the upper magnetic shielding layer 8 is formed of permalloy ($Ni_{80}Fe_{20}$), the lower magnetic shielding layer 3 is formed of nickel iron ($Ni_xFe_{100-x}$, where x<50), FeZrN, or CoZrNb which has electric resistivity of 70 $\mu\Omega$cm or more, or else other magnetic material with electric resistivity of more than 100 $\mu\Omega$cm. In addition, a granular layer which is formed by mixing $Al_2O_3$ particles into an SiFe layer may be used as the lower magnetic shielding layer 3.

It is preferable that electric resistance of the first magnetic material exceeds 100 $\mu\Omega$cm. Here a thickness of the lower magnetic shielding layer 3 is about 1.5 $\mu$m.

The magnetoresistive element 5 being formed on the lower nonmagnetic insulating layer 4 is displaced in the vicinity of a top end of the lower magnetic shielding layer 3. As shown in FIG. 4, first and second lead wirings 6a, 6b made of gold (Au) are connected to both sides of the magnetoresistive element 5. As shown in FIG. 4, the first and second lead wirings 6a, 6b are placed on the lower magnetic shielding layer 3 to be separated mutually along both sides of the lower magnetic shielding layer 3.

The magnetoresistive element 5 and the first and second lead wirings 6a, 6b are covered with the upper nonmagnetic insulating layer 7 except for their top ends. In addition, the upper magnetic shielding layer 8 is formed on the upper nonmagnetic insulating layer 7.

The upper magnetic shielding layer 8 is formed of soft magnetic material such as permalloy having a thickness of 3.5 µm, for example. As shown in FIG. 4, a planar shape of the upper magnetic shielding layer 8 is defined such that the planar shape is placed over front side portions of the first and second lead wirings 6a, 6b and that, as shown in FIG. 3, the planar shape is formed to have a size on which a part of the spiral coil 13 can be superposed. Furthermore, edge portions of the upper magnetic shielding layer 8 which are intersected with the spiral coil 13 are formed so as to intersect substantially orthogonally with tangential directions of curvatures of the spiral coil 13, whereby preventing breaking of the spiral coil 13. Further, the upper magnetic shielding layer 8 is covered with an insulating gap layer 11 made of $Al_2O_3$ of about 0.2 to 0.6 µm thickness.

The above spiral coil 13 is covered with a coating insulating layer 12 on the MR head 10. Also, portions of the spiral coil 13 located over the upper magnetic shielding layer 8 are covered with an upper magnetic pole 14 via the coating insulating layer 12. The coating insulating layer 12 consists of upper and lower organic insulating layers 12a, 12b which sandwich the spiral coil 13 therebetween. Both ends of the spiral coil 13 are connected to a recording signal circuit (not shown).

The upper magnetic pole 14 is formed of soft magnetic material such as permalloy. As shown in FIGS. 3 and 5, the upper magnetic pole 14 is connected to the upper magnetic shielding layer 8 through a central clearance of the spiral coil 13 and the upper and lower organic insulating layers 12a, 12b. Therefore, the upper magnetic shielding layer 8 together with the upper magnetic pole 14 serves as the magnetic pole of the induction type head 20.

The upper magnetic pole 14 comes into contact with an upper surface of the insulating gap layer 11 at its top end portion. Thus the recording gap G which has a width equivalent to a thickness of the insulating gap layer 11 is formed between the top end of the upper magnetic pole 14 and the top end of the upper magnetic shielding layer 8.

In this case, the induction type head 20 is composed of the upper magnetic pole 14, the spiral coil 13, the coating insulating layer 12, and the upper magnetic shielding layer 8. The upper magnetic shielding layer 8 acts as the lower magnetic pole of the induction type head 20. In FIG. 2, a reference numeral 15 denotes a magnetic recording medium.

In the joint type composite magnetic head as described above, in the event that electric resistance of the lower magnetic shielding layer 3 of the MR head 10 is enhanced higher than that of the upper magnetic pole 14, the eddy current due to the recording magnetic field passing through the lower magnetic shielding layer 3 can be reduced. As a result, a component of the recording magnetic field passing through the lower magnetic shielding layer 3 can be output with good efficiency. Therefore, an efficiency of the recording magnetic field generated from the induction type head 20 can be improved.

Figure 6:
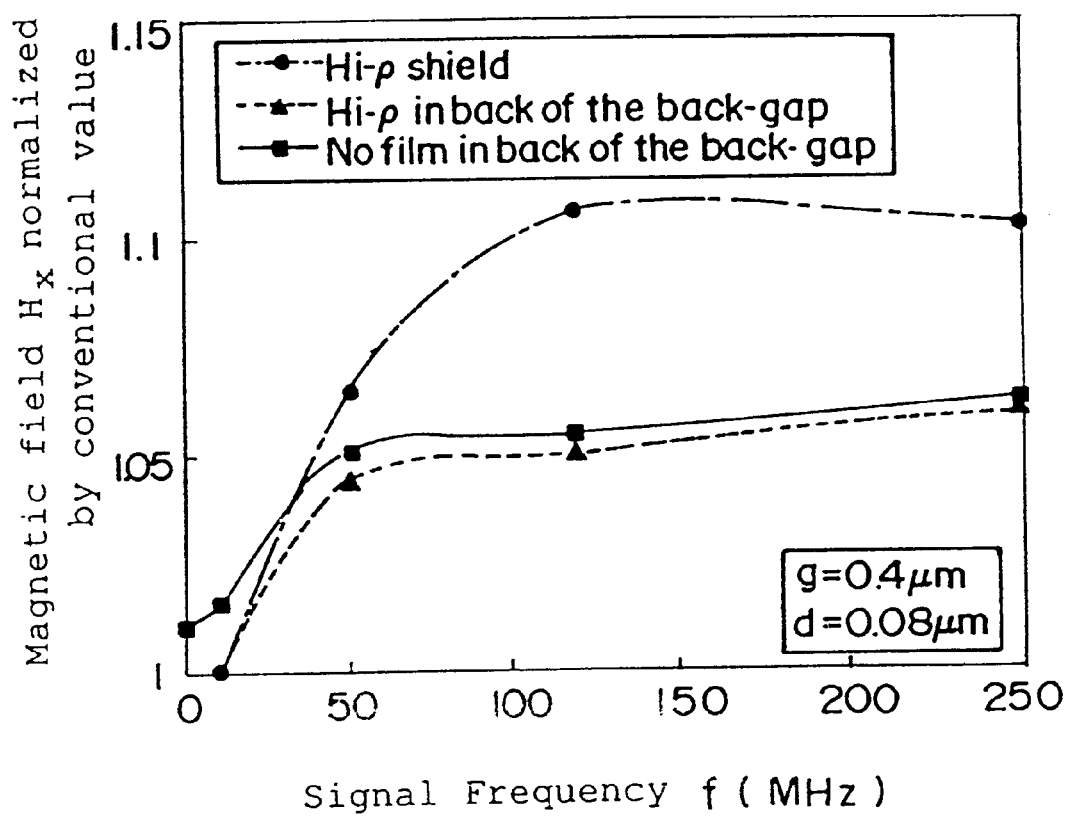
FIG. 6 is a characteristic view showing a recording magnetic field vs. a recording frequency so as to compare respective recording magnetic fields which are generated by the joint type composite magnetic heads according to first to third embodiments of the present invention and the conventional composite magnetic head.

Therefore, in case both frequency characteristics of the conventional composite magnetic head wherein magnetic material of the lower magnetic shielding layer is made of permalloy and the joint type composite magnetic head wherein the lower magnetic shielding layer 3 is made of nickel iron having electric resistivity of 70 µΩcm are compared with each other, the result has been derived as shown by a dot-dash line in FIG. 6.

An ordinate in FIG. 6 is a recording magnetic field which is normalized by setting a conventional longitudinal component of the recording magnetic field Hx (kOe) as "1". That is, the ordinate in FIG. 6 indicates the longitudinal component of the recording magnetic field Hx according to the first embodiment of the present invention. The two-dimensional finite element method with regard to the eddy current has been employed in calculating the recording magnetic field. Such a longitudinal component of the recording magnetic field Hx is a component of the magnetic field of the lower magnetic shielding layer 3 along the longitudinal direction (X direction). In other words, the ordinate indicates the magnitude of the magnetic field Hx at a position of 0.08 µm from the top end of the 0.4 µm thick recording gap layer 11 along the X direction. On the contrary, an abscissa of FIG. 6 indicates a signal frequency (MHZ) of a rectangular signal voltage to be applied to the spiral coil 13.

It is obvious from the dot-dash line in FIG. 6 that the recording magnetic field being output from the magnetic pole of the composite magnetic head according to the first embodiment of the present invention is larger than that of the conventional composite magnetic head. Especially, it can be understood that the composite magnetic head according to the first embodiment of the present invention can provide the recording magnetic field about 10% higher than that provided by the conventional composite magnetic head in the high frequency range of more than 50 MHZ.

Upon examining the frequency characteristics in FIG. 6, the same conditions other than constituent material of the lower magnetic shielding layer are applied to both structures of the composite magnetic head according to the first embodiment and the conventional composite magnetic head.

(Second Embodiment)

Although the lower magnetic shielding layer 3 of the MR head 10 has been formed completely of magnetic material with high electric resistance in the first embodiment, a part of the lower magnetic shielding layer 3 may be formed of magnetic material with high electric resistivity. Such embodiment will be explained as a second embodiment hereunder.

Figure 7:
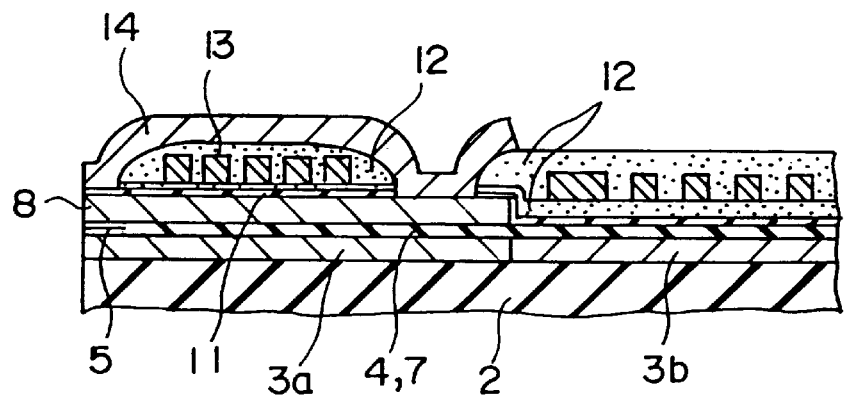
FIG. 7 is a sectional view showing a joint type composite magnetic head according to a second embodiment of the present invention.
Figure 8:
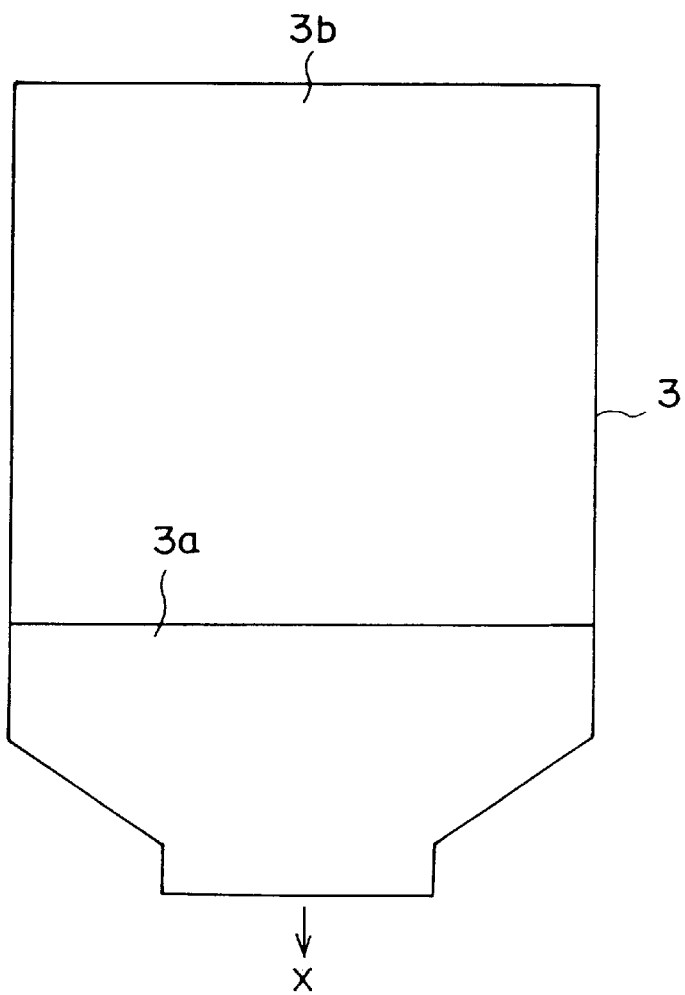
FIG. 8 is a plan view showing a lower magnetic shielding layer of the joint type composite magnetic head shown in FIG. 6.

FIG. 7 is a sectional view showing a part of a joint type composite magnetic head according to the second embodiment of the present invention. FIG. 8 is a plan view showing a lower magnetic shielding layer of the joint type composite magnetic head shown in FIG. 7. In FIG. 7, like reference numerals in FIG. 2 refer to like elements.

In the joint type composite magnetic head, a first area 3a of the lower magnetic shielding layer 3 including an area below the upper magnetic pole 14 and a second area 3b of the lower magnetic shielding layer 3 except for the first area 3a are formed of different magnetic material respectively. A boundary between the first area 3a and the second area 3b is positioned slightly in the rear side area rather than the connection portion between the upper magnetic pole 14 and the upper magnetic shielding layer 8. Where a "front side" area of the lower magnetic shielding layer 3 means a portion of the lower magnetic shielding layer 3 opposing to the magnetic recording medium 15 while a "rear side" area of the lower magnetic shielding layer 3 means a portion of the lower magnetic shielding layer 3 being opposite to the "front side" area.

In the lower magnetic shielding layer 3, the second area 3b is formed of magnetic material with higher electric resistance than that of the first area 3a. As a technique of changing the electric resistance of the first area 3a and the second area 3b, in the case that the lower magnetic shielding layer 3 is formed of soft magnetic material such as permalloy, for example, electric resistivity of the second area 3b can be increased rather than the first area 3a by ion-implanting an element such as carbon into the second area 3b or oxidizing the second area 3b only while keeping the soft magnetic material in the first area 3a as it is. Otherwise, magnetic material for both the first area 3a and the second area 3b may be changed previously. As such magnetic material, the granular layer in which $Al_2O_3$ particles are included into the SiFe layer may be employed, for example.

With the above configuration, since the eddy current due to the high frequency magnetic field passing through the lower magnetic shielding layer 3 can be reduced in the second area 3b, the efficiency in generating the recording magnetic field can be enhanced and also reduction in capability as the magnetic shielding layer can be prevented while keeping a high permeability of the first area 3a.

Therefore, if both frequency characteristics of the joint type composite magnetic head wherein the first area 3a of the lower magnetic shielding layer 3 is made of permalloy and the second area 3b is made of material having electric resistivity of 70 $\mu\Omega$cm and the conventional joint type composite magnetic head are compared with each other, the result has been derived as shown by a broken line in FIG. 6.

The ordinate and abscissa of FIG. 6 are similar to those explained in the first embodiment. The two-dimensional finite element method with regard to the eddy current is employed in calculating the recording magnetic field. The longitudinal component of the recording magnetic field Hx is a component of the magnetic field of the lower magnetic shielding layer 3 along the longitudinal direction. That is, the longitudinal component of the recording magnetic field Hx indicates the magnitude of the magnetic field Hx at a position of 0.08 $\mu$m from the top end of the 0.4 $\mu$m thick recording gap layer 11.

It is evident from the broken line in FIG. 6 that the magnetic field output from the magnetic pole in the composite magnetic head according to the second embodiment has been increased in contrast to the conventional composite magnetic head. Especially, it can be understood that the composite magnetic head according to the second embodiment of the present invention can provide the recording magnetic field about 10% higher than that provided by the conventional composite magnetic head in the high frequency range of more than 50 MHZ.

The composite magnetic head according to the second embodiment is different in structure from the conventional composite magnetic head in that the lower magnetic shielding layer is formed of different constituent material.

(Third Embodiment)

Although the lower magnetic shielding layer 3 of the MR head 10 is formed completely of magnetic material with high electric resistance in the first embodiment, a part of the lower magnetic shielding layer 3 may be removed. Such embodiment will be explained hereunder.

Figure 9:
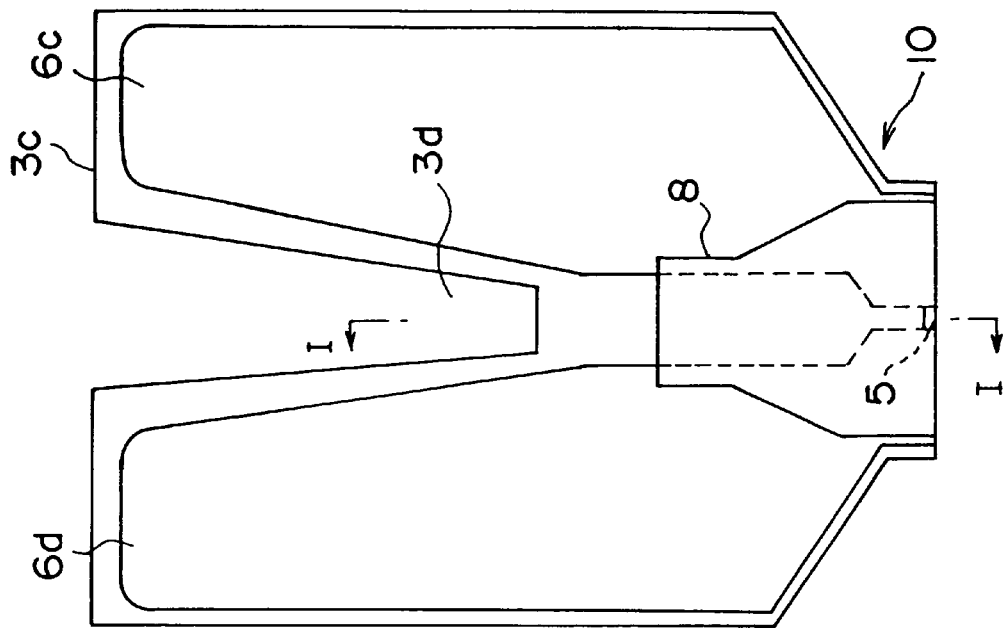
FIG. 9 is a plan view showing an MR head constituting a joint type composite magnetic head according to a third embodiment of the present invention.
Figure 10:
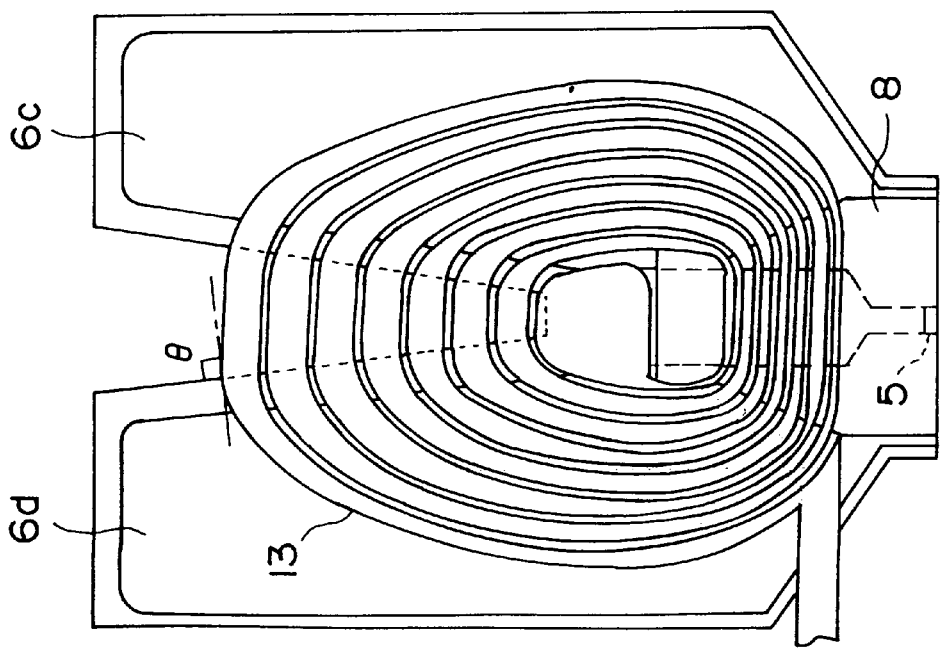
FIG. 10 is a plan view showing the joint type composite magnetic head according to the third embodiment of the present invention.

FIG. 9 is a plan view showing an MR head in a joint type composite magnetic head according to a third embodiment of the present invention. FIG. 10 is a plan view showing the joint type composite magnetic head in FIG. 9. An insulating layer is omitted from the joint type composite magnetic head in these figures. In FIGS. 9 and 10, like reference numerals in FIG. 2 denote like elements.

Figure 11A:
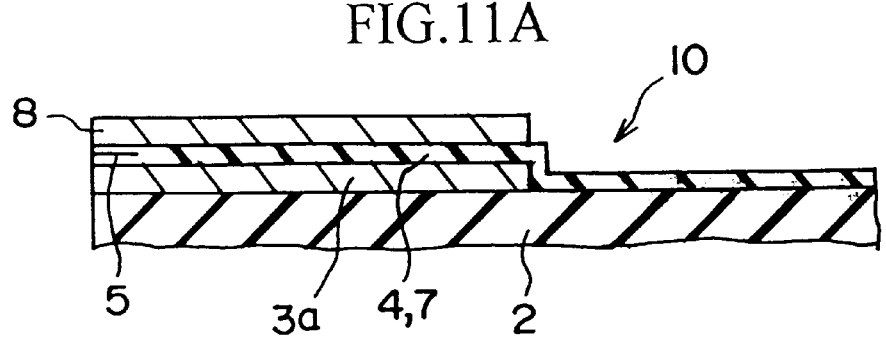
FIGS. 11A to 11C are sectional views illustrating manufacturing steps of an induction type head of the joint type composite magnetic head according to the third embodiment of the present invention.

In this joint type composite magnetic head, a notched portion 3d is provided in the rear side area of the lower magnetic shielding layer 3 rather than the connection portion between the upper magnetic pole 14 and the upper magnetic shielding layer 8 so as to separate the lower magnetic shielding layer 3 into right and left parts. Because of the presence of the notched portion 3d, an almost U-shaped planar shape of the lower magnetic shielding layer 3 can be obtained. A sectional shape of the MR head 10, if viewed from a line I—I in FIG. 9, can be given as shown in FIG. 11A.

Figure 11B:
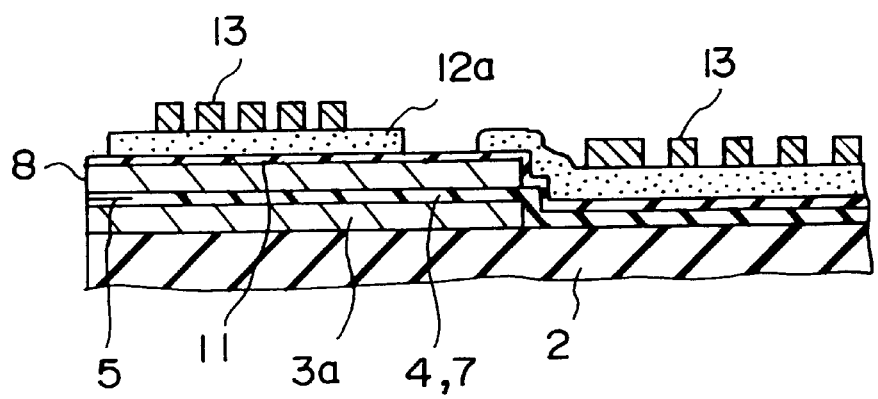

If the recording gap layer 11, the lower organic insulating layer 12a, and the spiral coil 13 are formed in sequence on the MR head 10, a sectional shape as shown in FIG. 11B can then be derived.

Meanwhile, first and second lead wirings 6a, 6b are extended on the lower magnetic shielding layer 3 to both sides of the notched portion 3d of the lower magnetic shielding layer 3. Edges of the notched portion 3d which intersect with the spiral coil 13 are formed to intersect substantially orthogonally with tangential lines to the spiral coil 13. Therefore, breaking of the spiral coil 13 due to unevenness caused by the notched portion 3d can be prevented. In this case, if a tangential angle θ of the spiral coil 13 relative to the edges of the notched portion is out of the range of about 80° to 100°, it has been evident empirically that the breaking of the spiral coil 13 occurs easily. Accordingly, an inclination angle θ of the edges of the notched portion 3d must be determined not to be out of such range.

Figure 11C:
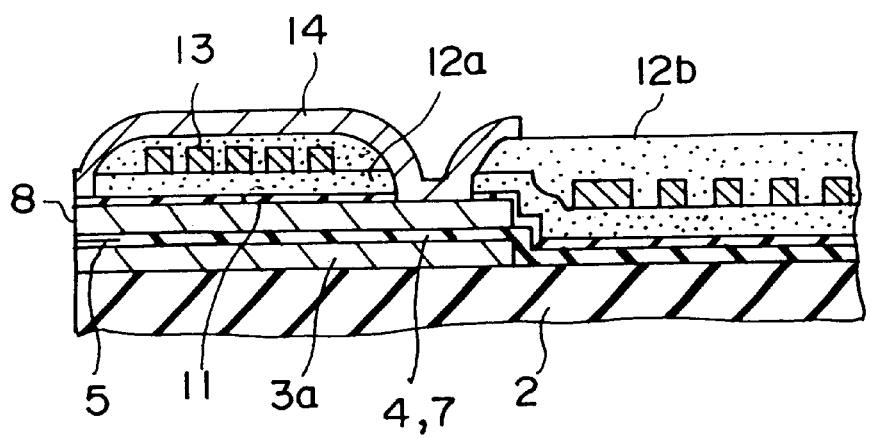

After the spiral coil 13 has been formed under these conditions, as shown in FIG. 11C, an upper organic insulating layer 12b is formed so as to cover the spiral coil 13, and then an upper magnetic pole 14 is formed on the upper organic insulating layer 12b to pass through the lower insulating layer 12a and the upper organic insulating layer 12b and then come into contact with the upper magnetic shielding layer 8.

With the above configuration, since a total sum of the eddy current due to the high frequency magnetic field passing through the lower magnetic shielding layer 3 can be reduced according to the area of the notched portion 3d, loss of the recording magnetic field can be made small and thus an efficiency in generating the recording magnetic field can be enhanced. In other words, the notched portion 3b serves as a high electric resistance area, as in the first and second embodiments.

Therefore, if both frequency characteristics of the joint type composite magnetic head wherein the lower magnetic shielding layer 3 is made of permalloy and the notched portion 3d is formed in the rear side area of the lower magnetic shielding layer 3 and the conventional joint type composite magnetic head are compared with each other, the result has been derived as shown by a solid line in FIG. 5.

The two-dimensional finite element method with regard to the eddy current is employed in calculating the recording magnetic field in FIG. 6. The longitudinal component of the recording magnetic field Hx is a component of the magnetic field of the lower magnetic shielding layer 3 along the longitudinal direction, and indicates the magnitude of the magnetic field Hx at a position of 0.08 $\mu$m from the top end of the 0.4 $\mu$m thick recording gap layer 11.

It is obvious from the solid line in FIG. 6 that the magnetic field being output from the magnetic pole in the composite magnetic head according to the third embodiment has been increased rather than the conventional composite magnetic head. Especially, the composite magnetic head according to the third embodiment can provide the recording magnetic field about 5% higher than that provided by the conventional composite magnetic head in the high frequency range of 50 MHZ or more.

A difference in structure between the composite magnetic head according to the third embodiment and the conventional composite magnetic head resides in that the lower magnetic shielding layer, the lead wirings, and the spiral coil are shaped differently.

(Fourth Embodiment)

In the above first to third embodiments, mainly the joint type composite magnetic heads which have the lower magnetic shielding layer shaped differently from that of the conventional composite magnetic head have been explained. The above features of the lower magnetic shielding layer may also be applied to the upper magnetic shielding layer of the separate type composite magnetic head. In such case, the recording magnetic field can be generated from the recording gap in the magnetic pole with good efficiency.

Figure 12:
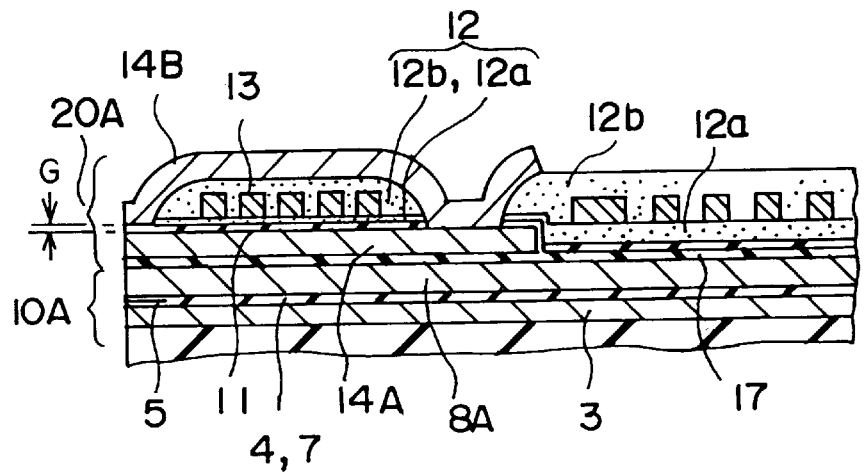
FIG. 12 is a sectional view showing a first example of a separate type composite magnetic head according to a fourth embodiment of the present invention.

More particularly, as shown in FIG. 12, as magnetic material of the upper magnetic shielding layer 8A of the MR head 10A, magnetic material is selected which has electric resistance higher than those of the upper magnetic pole 14B and the lower magnetic pole 14A of the induction type head 20A.

Figure 13A:
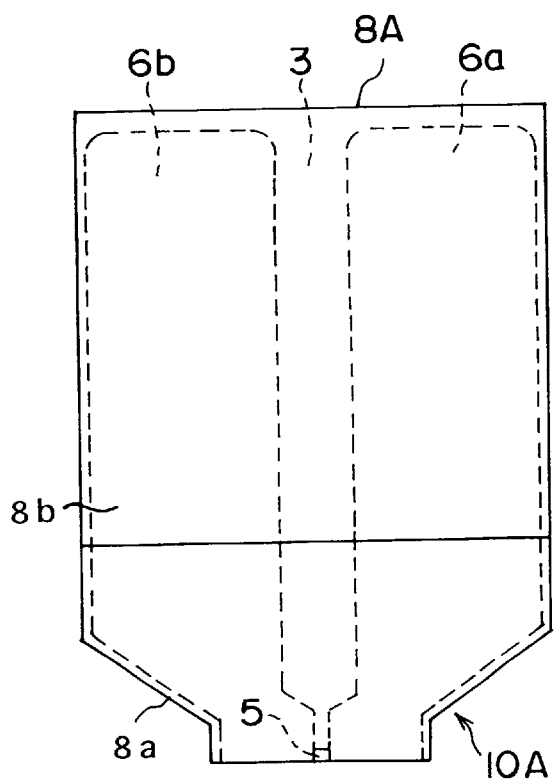
FIG. 13A is a plan view showing an MR head used in a second example of the separate type composite magnetic head according to the fourth embodiment of the present invention.

As shown in FIG. 13A, in the MR head 10A, electric resistivity of a second area 8b of the upper magnetic shielding layer 8B, which is positioned in the rear side area rather than the connection portion between the upper magnetic pole 14B and the lower magnetic pole 14A of the induction type head 20A, is made higher than that of a first area 8a.

Figure 13B:
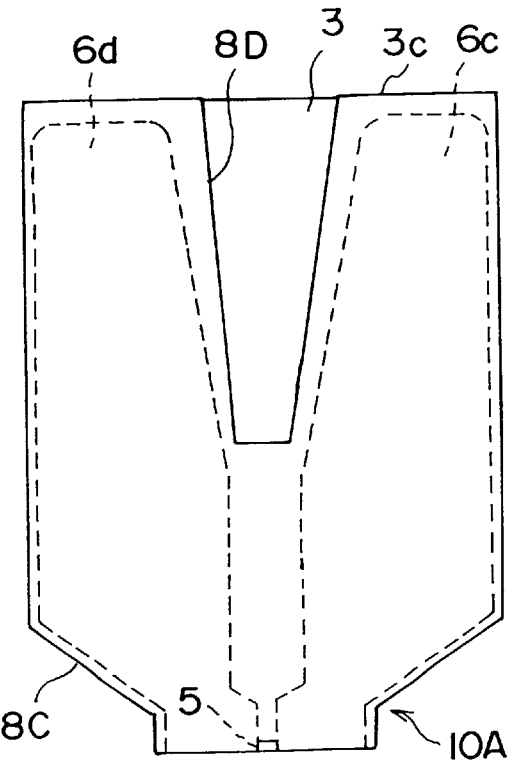
FIG. 13B is a plan view showing an MR head used in a third example of the separate type composite magnetic head according to the fourth embodiment of the present invention.

In turn, as shown in FIG. 13B, a notched portion 8D to separate the upper magnetic shielding layer BC into right and left parts is provided in the upper magnetic shielding layer 8C of the MR head 10A in the rear side area rather than the connection portion between the upper magnetic pole 14B and the lower magnetic pole 14A. Accordingly, the upper magnetic shielding layer 8C is formed to have a substantially U-shaped planar shape and then the notched portion 8D serves as a high resistance area. A shape of the notched portion 8D is set to be identical to that of the notched portion 3d in FIG. 9.

In FIGS. 12 and 13, a reference numeral 17 denotes a nonmagnetic separating layer made of nonmagnetic insulating material such as $Al_2O_3$ to separate the MR head 10A from the induction type head 20A. In FIGS. 12 and 13, like reference numerals in FIG. 2 refer to like elements.

(Fifth Embodiment)

Figure 14:
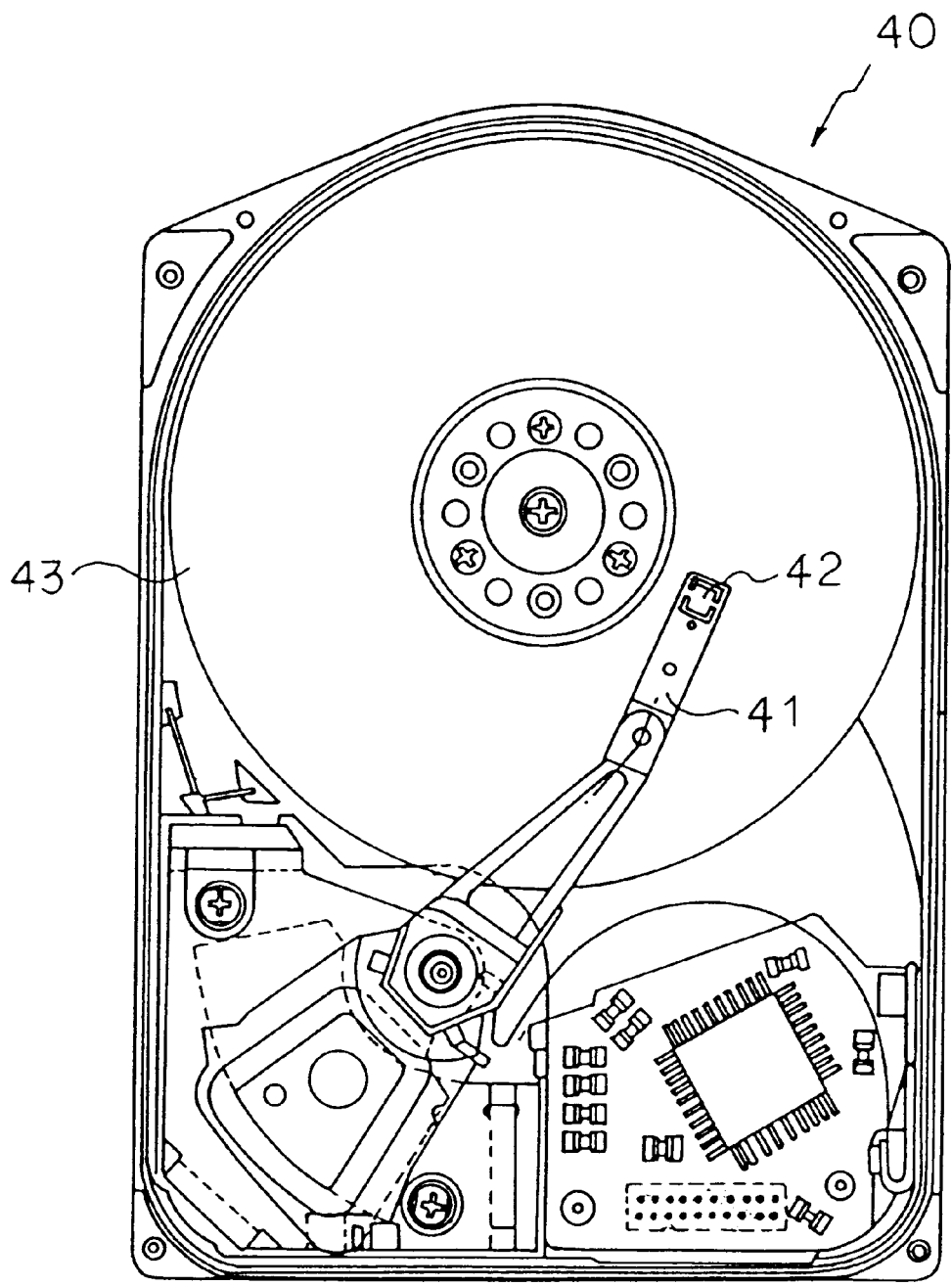
FIG. 14 is a plan view showing a magnetic disc drive having the composite magnetic head according to the present invention.

In a fifth embodiment of the present invention, the composite magnetic heads set forth in the first to fourth embodiments may be incorporated into a magnetic disc drive shown in FIG. 14, for example, respectively.

In a housing of the magnetic disc drive 40, the composite magnetic head 42 having the above structure is fitted to the top end of an arm 41. The arm 41 is fitted such that its top end can be move over a magnetic disc 43.

According to the present invention as described above, in the case of the joint type composite magnetic head, electric resistance of at least the rear side area of the lower magnetic shielding layer of the reproducing head is increased or the notched portion is provided in the rear side area of the lower magnetic shielding layer whereas, in the case of the separate type composite magnetic head, electric resistance of at least the rear side area of the upper magnetic shielding layer of the reproducing head is increased or the notched portion is provided in the rear side area of the upper magnetic shielding layer. As a consequence, in the magnetic path through which the high frequency magnetic field leaked from the recording head returns again to the recording head via the magnetic shielding layer formed below the recording head, the eddy current generated in the high resistance area of the magnetic shielding layer can be suppressed to thus reduce loss and therefore the recording magnetic field can be generated from the recording head with good efficiency.

What is claimed is:

1. A thin magnetic head having a front half area facing a magnetic recording medium and a rear half area opposite said front half area, comprising:

a first magnetic layer formed over said front half area and said rear half area on a substrate and having a notched portion where said first magnetic layer is partly removed in said rear half area;

a first nonmagnetic insulating layer formed on said first magnetic layer;

a second magnetic layer formed on said first nonmagnetic insulating layer in said front half area;

a second nonmagnetic insulating layer formed on said second magnetic layer;

a coil formed over said front half area and said rear half area above said first magnetic layer to intersect in part with said second nonmagnetic insulating layer;

a third magnetic layer formed on said second nonmagnetic insulating layer in connection to said second magnetic layer via a part of central clearance of said coil; and a nonmagnetic gap layer interposed between said third magnetic layer and said second magnetic layer so as to face said magnetic recording medium.

2. A thin film magnetic head of claim 1, wherein an angle between side edge line of said notched portion and a tangential line of said coil is set within a range of 80 degrees to 100 degrees.

3. A thin film magnetic head of claim 1, wherein said first magnetic layer has a substantially U shaped planar surface.

4. A thin film magnetic head of claim 1, wherein a magnetoresistive element is formed between said first magnetic layer and said second magnetic layer.

5. A thin film magnetic head of claim 4, wherein a magnetoresistive element is formed between said first magnetic layer and said second magnetic layer.

6. A thin film magnetic head of claim 4, wherein said magnetoresistive element is formed in said first nonmagnetic insulating layer between said first magnetic layer and said second magnetic layer.

7. A thin film magnetic head of claim 4, wherein first and second leads are connected to both sides of said magnetoresistive element respectively, and said first and second leads extend to both side areas of said notched portion.

8. A thin film magnetic head of claim 1, further comprising:

a magnetic shielding layer formed between said substrate and said first magnetic layer;

a fourth nonmagnetic insulating layer formed between said magnetic shielding layer and said first magnetic layer; and a magnetoresistive element in said fourth nonmagnetic insulating layer.

9. A thin film magnetic head having a front half area opposing a magnetic recording medium and a rear half area opposite said front half area, comprising:

a first magnetic layer formed over said front half area and said rear half area on a substrate directly or via an insulating layer;

a first nonmagnetic insulating layer formed on said first magnetic layer;

a second magnetic layer formed on said first nonmagnetic insulating layer in said front half area and a second electric resistivity of said second magnetic layer being lower than a first electric resistivity of said first magnetic layer;

a second nonmagnetic insulating layer formed on said second magnetic layer;

a coil formed over said first magnetic layer to intersect in part with said second nonmagnetic insulating layer;

a third magnetic layer formed on said second nonmagnetic insulating layer in connection to said second magnetic layer via a part of central clearance of said coil; and a nonmagnetic gap layer interposed between said third magnetic layer and said second magnetic layer so as to face said magnetic recording medium.

10. A thin film magnetic head of claim 9, further comprising:

a magnetic shielding layer formed between said substrate and said first magnetic layer;

a fourth nonmagnetic insulating layer formed between said magnetic shielding layer and said first magnetic layer; and a magnetoresistive element in said fourth nonmagnetic insulating layer.

11. A thin film magnetic head of claim 9, wherein said first electric resistivity is set more than twice said second electric resistivity.

12. A thin film magnetic head of claim 9, wherein a magnetoresistive element is formed in said first nonmagnetic insulating layer between said first magnetic layer and said second magnetic layer.

* * * * *

UNITED STATES PATENT AND TRADEMARK OFFICE
CERTIFICATE OF CORRECTION

PATENT NO. : 6,002,555
DATED : December 14, 1999
INVENTOR(S) : Tagawa

It is certified that error appears in the above-identified patent and that said Letters Patent is hereby corrected as shown below:

Column 10, line 8, after "thin" insert --film--

Signed and Sealed this

Third Day of April, 2001

Attest:

NICHOLAS P. GODICI

Attesting Officer

Acting Director of the United States Patent and Trademark Office